3,484,738
DEVICE FOR SIMULATING PROGRESSIVELY
DELAYED OUTPUTS LINEAR HYDROPHONE
ARRAY
Samuel W. Autrey, Fullerton, Calif., assignor, by mesne assignments, to the United States of America as represented by the Secretary of the Navy
Filed May 20, 1968, Ser. No. 730,467
Int. Cl. H04b 13/00; G06g 7/48; G01s 9/00
U.S. Cl. 340—5                                                         2 Claims

ABSTRACT OF THE DISCLOSURE

A device for simulating the progressively delayed outputs resulting from impingement of coherent energy on a line array of equally spaced hydrophones. The device utilizes modulator means responsive to a generated clock frequency to convert a simulated target input signal into a single bit pulse train, and utilizes one or more shift register means having a plurality of taps for converting the single bit pulse train into a plurality of output pulse trains with delays therebetween. A plurality of synchronous demodulators reconstitute the output pulse trains into a plurality of progressively delayed output signals simulative of hydrophone outputs, the delays being variable to simulate different directions of energy approach by change of the clock frequency.

BACKGROUND OF THE INVENTION

This invention relates generally to sonar equipment of the type comprising a linear array of equally spaced hydrophones and so-called beam-forming networks which operate on the outputs of the hydrophones to provide indication of the direction or bearing from which come the sonic energy causing the outputs. Such equipment depends, for its direction detecting ability, upon the time intervals between impingements of a wave front of sonic energy upon the individual hydrophones.

Because of the obvious problems and limitations inherent in the use of actual sonic targets for the purposes of testing and checking the operability and accuracy of such sonar beam-forming networks and also for the purpose of training sonar operators in the use of their equipment, it is desirable to provide means for simulating the outputs resulting from impingement of coherent sonic energy on a line array of equally spaced hydrophones. Such is the primary object of this invention.

SUMMARY OF THE INVENTION

With the foregoing in mind it is another object of the invention to provide improved apparatus for achieving progressive delays of a generated, sound simulating signal so as to provide a plurality of simulated hydrophone outputs which can be applied to beam-forming means for use in the testing of sonar equipment or training operators thereof.

A further object of the invention is the provision of improved apparatus for achieving the progressive delays of an input signal through the agency of shift register means whereby the desired delays may be accomplished digitally.

Yet another object of this invention is the provision of a simulation apparatus or device of the above mentioned character and which can simulate the arrival of the coherent sonic energy from any one of many different directions with a minimum of equipment.

As another object the invention aims to accomplish the simulation of outputs resulting from impingement of coherent energy on a line array of hydrophones from selected directions through the provision of clock means for providing clock signals at different frequencies, modulator means for converting an input signal to a single bit pulse train, shift register means for producing, from the single bit pulse train and the clock frequency, a plurality of output pulse trains corresponding to the single bit pulse train but progressively delayed, and synchronous demodulator means for reconstituting the output pulse trains into simulated hydrophone output signals, the simulated direction of approach of the simulated energy being changeable by change of the clock frequency.

BRIEF DESCRIPTION OF THE DRAWING

Other objects and many of the attendant advantages of the invention will become apparent from the following detailed description of a preferred embodiment thereof when read in conjunction with the accompanying sheets of drawings forming a part of this specification, and in which.

DESCRIPTION OF THE PREFERRED EMBODIMENT

Figure 1:
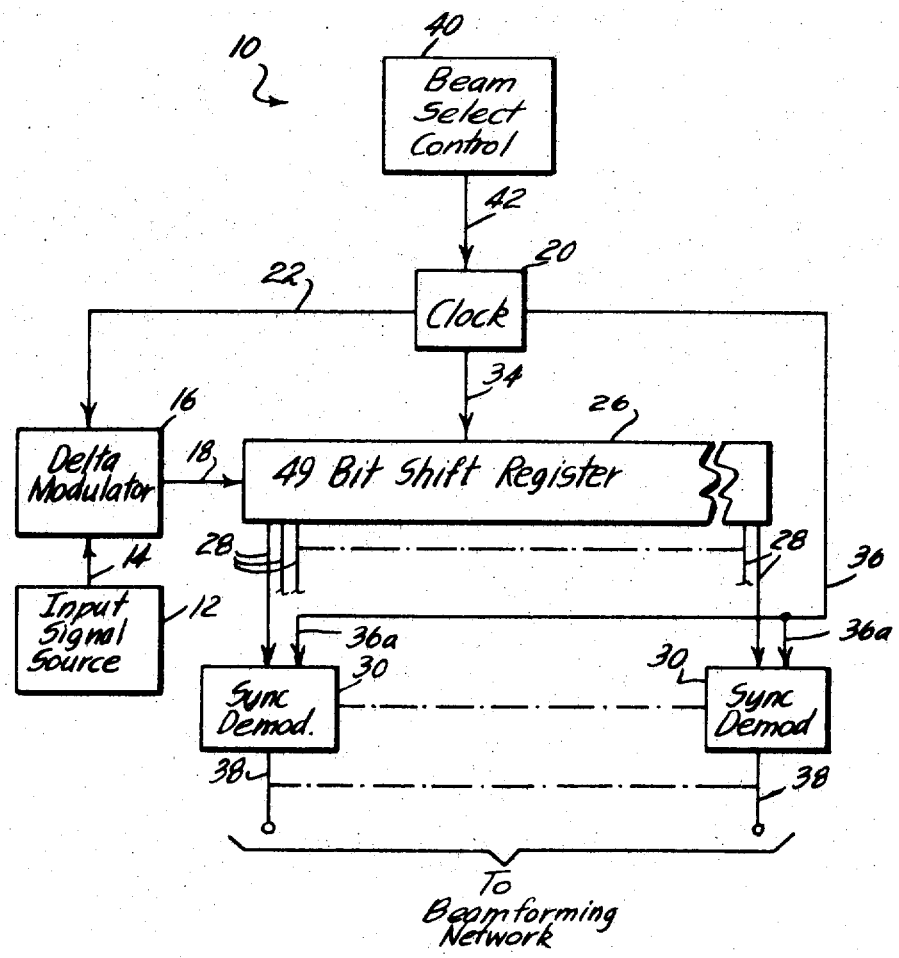
FIG. 1 is a diagrammatic illustration, in block form, of a simulation device embodying the present invention.

In the form of the invention illustrated in the drawing and described hereinafter there is provided a device, generally indicated at 10, for simulating the outputs which would result from the impingement of coherent energy on a line array of equally spaced hydrophones (not shown). The device 10 comprises an input signal source 12 which may conveniently be in the form of a suitable signal generator providing frequencies such as may be expected to be detected by the hydrophones of the array being simulated or such as may be desired for test purposes. The input signal source 12 is connected, as shown by flow line 14, to a delta modulator 16 which provides, as an output on line 18, a single bit pulse train which is a modulated representation of the input signal on line 14. This is accomplished by the modulator 16 which periodically samples the input signal from source 12 at a frequency determined by a variable frequency timing device or clock 20 which is connected via line 22 to the modulator.

The pulses of the single bit pulse train are applied via line 18 as an input to a shift register 26. The shift register in this example is a 49 bit having fifty output taps each of which is connected by a line 28 to one of a plurality of synchronous demodulators 30, there being a line 28 and a demodulator 30 corresponding to each of the fifty tap points.

The clock 20 is connected by line 34 to the shift register 26 which is actuated once each bit time by the clock 20 to yield an output at each of the tap lines 28. Thus, as the input pulses on line 18 are accepted and shifted along the register 26 by an amount equal to each tap with each successive bit time, the outputs on lines 28 will each be identical to the input pulse train on line 18 but will be progressively delayed by an amount of one bit time of the basic clock frequency between each of the outputs on the lines 28.

The clock 20 is further connected by lines 36, 36a to each of the synchronous demodulators 30 which are operated thereby to convert the output pulse trains on lines 28 into reconstituted signals on lines 38, each substantially duplicating the input signal but delayed progressively by one bit time.

The maximum delays between outputs from a linear hydrophone array would correspond to an "end-fire" situation wherein the sound approaches the array on a path coincident with a line connecting the hydrophones. The minimum of substantially no delays occurs when the sound approaches along a line perpendicular to the said array which is a "broadside" situation. Simulation of the arrival of sound from other directions between end-fire and broadside are represented by delays between the minimum delays and the maximum delays.

Thus, to achieve the desired simulation of energy arrival from different directions, it is only necessary to change the frequency of operation of the variable frequency clock means 20. To this end, the clock means 20 may be under the control of a beam select control 40, connected by line 42 to the clock means, and which effects the necessary frequency change to simulate the approach of sound along a desired directional "beam."

In one proposed design having 200 possible beam steering angles per quadrant, the range of progressive delays runs from 3.75 μsec. to 750 μsec. in 3.75 μsec. steps. With the 49 bit shift register 26 of FIG. 1 this range could be accomplished with an upper clock frequency of 266.667 kHz. and a lower clock frequency of 1.333 kHz. However, sampling by the modulator 16 at this lower frequency would be inadequate for good representation of the input signal because it is too close to the frequencies being simulated. One solution to this would be to substitute 25 bits for each bit originally in the shift register 26 and increase the clock frequencies by a factor of 25 so as to range from a lower frequency of 33.333 kHz. to an upper frequency of 6.667 mHz. This would yield the same delays as formerly and the sampling rate would certainly be adequate.

Figure 2:
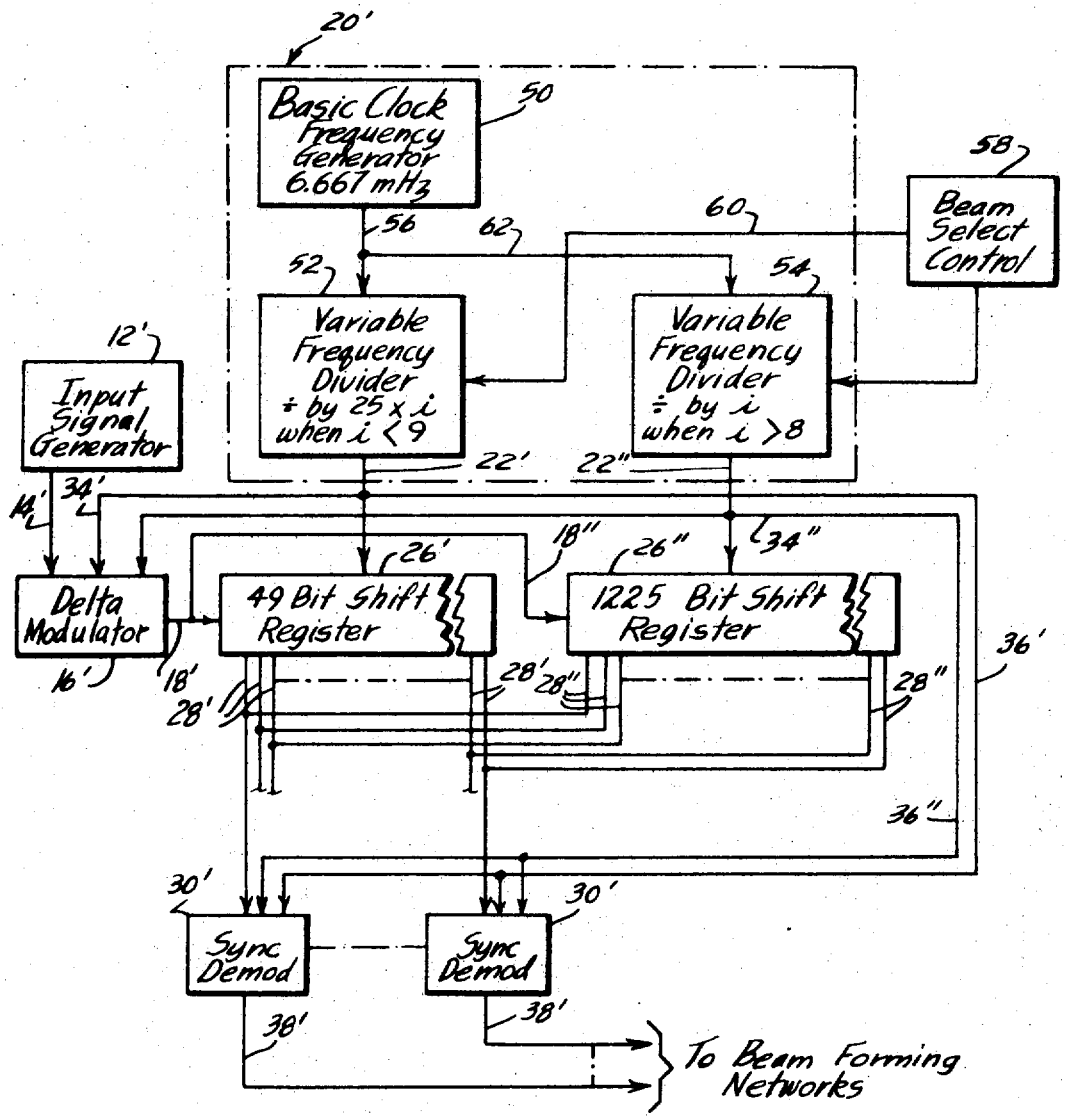
FIG. 2 is a diagrammatic illustration, in block form, of a modified form of simulation device embodying the invention.

If, however, it is desired to utilize microminiature shift registers, the upper frequency of 6.667 mHz. is found to be too high for the present state of the art of microminiaturization of shift registers. Accordingly, the invention contemplates for a preferrefd embodiment the utilization of two shift registers 26' and 26", illustrated in FIG. 2, wherein the register 26" has 25 bits between output taps 28" and is utilized in forming beams numbers 9 through 200, and the other register 26' has one bit between output taps 28' and is utilized in forming beams numbers 1 through 8.

The shift registers 26' and 26" each receive the single bit pulse train output of the modulator 16' via lines 18' and 18", the sampling frequency being determined by a variable frequency clock means 20'.

The variable frequency clock means 20' comprises a basic clock frequency generator 50 operating at a basic frequency of 6.667 megahertz, a first frequency divider 52 and a second frequency divider 54. The first frequency divider 52 is connected to receive the basic clock frequency signals or pulses via line 56 and is under the control of a beam select control 58 via line 60. The second frequency divider 54 is connected to receive the basic clock frequency via lines 56 and 62 and is under the control of the beam select control 58 via line 64.

If the beam select control 58 is conditioned to select the ith beam and that ith beam number is less than 9, a clock frequency will be derived in the variable frequency divider 52 by taking every 25×ith basic clock pulse and the derived frequency will be applied via lines 22', 34', and 36' to the modulator 16', the register 26' and the demodulators 30', respectively. If the beam select control 58 is conditioned to select the ith beam, the number of which is greater than eight, the clock frequency will be derived in the variable frequency divider 54 by taking every ith basic clock pulse and the derived frequency will be applied via lines 22", 34", and 36" to the modulator 16', the register 26" and the demodulators 30', respectively. The resulting outputs on lines 38' will then be simulative of the outputs of the individual outputs of the hydrophones in the array and may be applied to a beam-forming network for processing in the same manner as actual hydrophone outputs for testing, calibrating, or training purposes.

Obviously many modification and variations of the present invention are possible in the light of the above teachings. It is therefore to be understood that the invention may be practiced otherwise than as specifically described.

What is claimed is:
1. A device for simulating the progressively delayed outputs resulting from impingement of coherent energy on a line array of equally spaced hydrophones, said device comprising:
  an input signal source for providing an input signal including a frequency simulative of said coherent energy;
  variable clock means for providing clock signals at a predetermined frequency;
  modulator means connected to receive said clock signals and connected to receive said input signal, said modulator means being operative to sample said input signal at said predetermined frequency and to provide an output in the form of a single bit pulse train, each bit being representative of a sample of said input signal;
  multiple tap shift register means connected to receive as an input said pulse train output of said modulator means, said shift register means being connected to receive said clock signals and responsive thereto to provide output bits from the taps of the shift register, the output bits each delayed with respect to their origin as bits in said pulse train input to said shift register means by time delays depending upon said predetermined frequency of clock signals;
  a plurality of synchronous demodulator means each connected to receive said output bits from corresponding ones of said shift register taps and responsive to said clock frequency to yield a plurality of outputs corresponding to said input signal and identical to one another except for said time delays;
  said clock means comprising means for generating a variable basic clock frequency, a first frequency divider means for dividing said basic frequency by a first factor to provide a variable first predetermined frequency, a second frequency divider means for dividing said basic frequency by a second factor to provide a variable second predetermined frequency;
  said shift register means comprising first and second multiple tap shift registers;
  said device further comprising beam select control means operative to alternatively select a beam from either of first and second groups of beams in a numbered series of beams wherein said first group is comprised of beams numbered less than a predetermined number, and said second group is comprised of beams numbered greater than a predetermined number;
  said first shift register, said modulator means, and said demodulator means being responsive to said variable first predetermined frequency when a beam is selected from said first group; and
  said second shift register, said modulator means, and said demodulator means being responsive to said variable second predetermined frequency when a beam is selected from said second group.
2. A device as defined in claim 1, and wherein:
  said second shift register is characterized by a number of bits between each tap thereof which is a predetermined multiple of the number of bits between each tap of said first shift register; and
  said variable second predetermined frequency is equal to said basic clock frequency divided by the number of a beam when selected from said second group, and said first variable predetermined frequency is equal to said basic clock frequency divided by said predetermined multiple times the number of a beam selected from said first group.

References Cited

UNITED STATES PATENTS

| | | | |
|---|---|---|---|
| 3,167,738 | 1/1965 | Westerfield | 340—3 |
| 3,295,098 | 12/1966 | Brightman et al. | 340—5 |
| 3,324,452 | 6/1967 | Brightman et al. | 340—5 |
| 3,403,247 | 9/1968 | Morgan et al. | 35—10.4 X |

RICHARD A. FARLEY, Primary Examiner

U.S. Cl. X.R.

35—10.4; 235—184; 340—6